July 21, 1959
C. E. SWANEY
2,895,746
DETACHABLE GOOSENECK FOR TRAILERS AND
METHOD OF MANIPULATING THE SAME
Filed Aug. 7, 1957
4 Sheets-Sheet 1
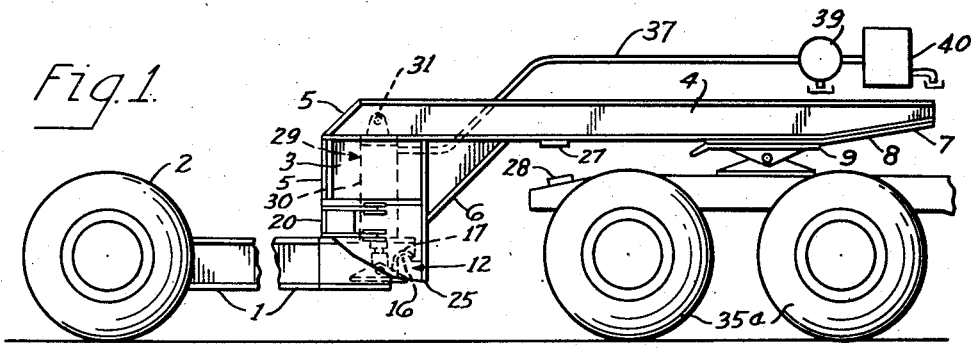
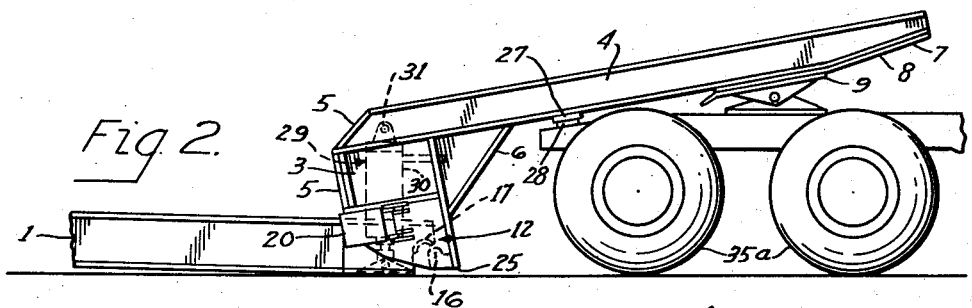
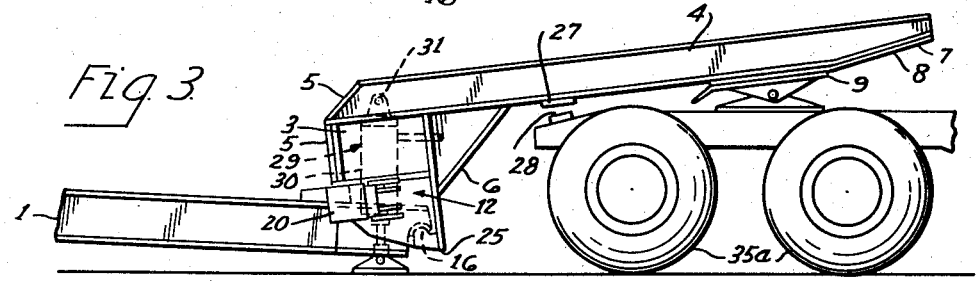
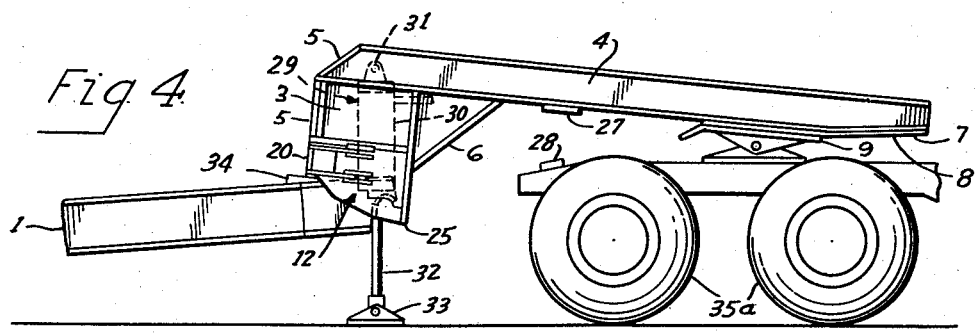
INVENTOR.
Charles E. Swaney,
BY
John H. Leonard,
his ATTORNEY.

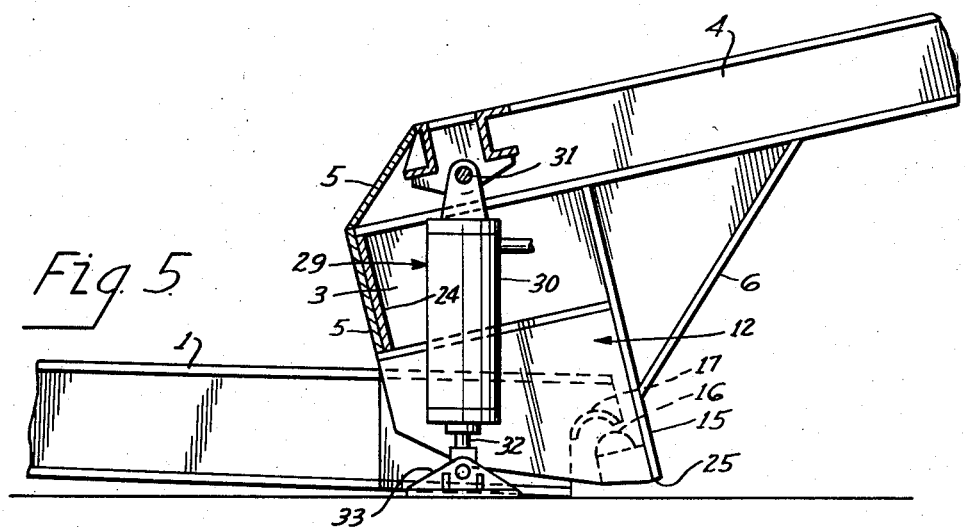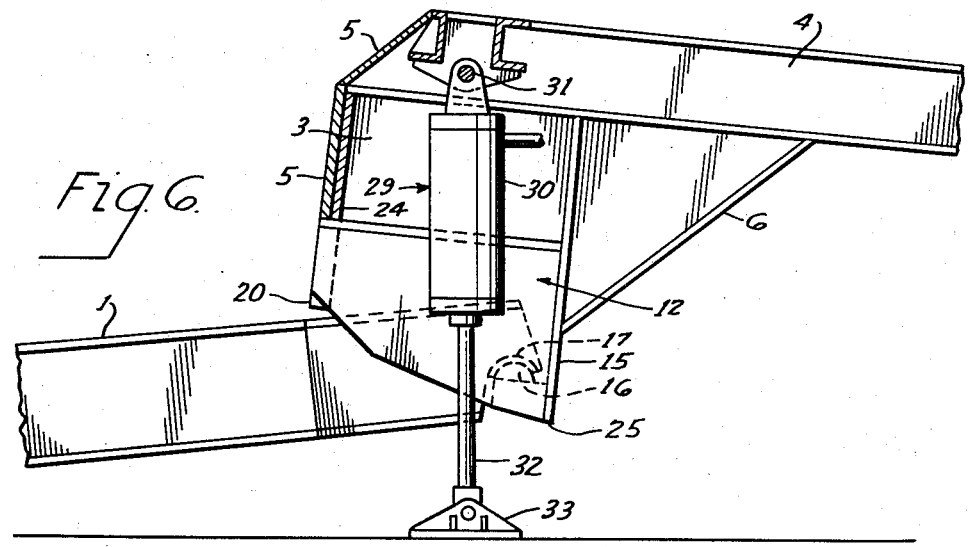

July 21, 1959

C. E. SWANEY 2,895,746

DETACHABLE GOOSENECK FOR TRAILERS AND
METHOD OF MANIPULATING THE SAME

Filed Aug. 7, 1957

INVENTOR.
Charles E. Swaney,
BY
John H. Leonard,
ATTORNEY.

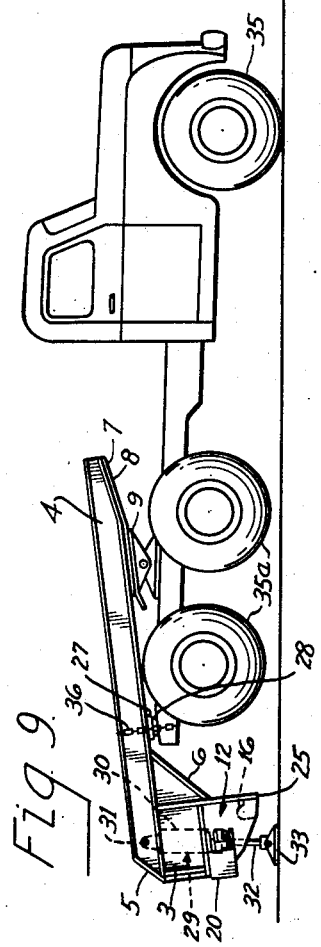

United States Patent Office 2,895,746
Patented July 21, 1959

2,895,746

DETACHABLE GOOSENECK FOR TRAILERS AND METHOD OF MANIPULATING THE SAME

Charles E. Swaney, Albion, Pa., assignor to Rogers Brothers Corporation, Albion, Pa., a corporation of Pennsylvania Application August 7, 1957, Serial No. 676,827

5 Claims. (Cl. 280—423)

This invention relates to detachable gooseneck trailers, such, for example, as detachable gooseneck trailers of the general character described in U.S. Letters Patent No. 2,590,210 of H. L. Rogers, dated March 25, 1952, and entitled Detachable Fluid Pressure Operated Goosenecks for Trailers, and particularly to a modification thereof by virtue of which, by manipulation of the gooseneck, the rear wheels of the tractor and also the rear wheels of the trailer can be lifted clear of the ground and supported in a position in which the tires or detachable wheels can readily be removed and replaced.

It is well known that great difficulty is encountered in lifting and supporting the rear wheels of the trailer or of the tractor of a heavy duty tractor-trailer combination above the ground level for the purpose of changing tires. This is particularly true in those instances when the terrain on which such equipment often operates is rough or soft.

In general, heretofore, the operation has required the detachment of the tractor from the trailer and the jacking up of the rear wheels of the tractor or trailer at the side on which the tires or wheels are to be changed. Not only are these operations time consuming, but they are dangerous to the operator, particularly when the trailer is heavy laden.

In accordance with the present invention, the wheel hoisting operations can be effected readily by an operator while manipulating the equipment at a point remote from the wheels.

The goosesneck preferably is of a type which is provided with a ground engaging hoist by which it is lifted into, and lowered out of, connecting position with respect to the trailer bed by rocking it about the usual transverse rocking axis of the fifth wheel member on the tractor.

In general, a hoisting of the rear wheels of the tractor is accomplished by providing a means for attaching the gooseneck hitch to the chassis or wheels of the tractor at a point on the gooseneck hitch rearwardly from the rocking axis in a manner such as to constrain the hitch from rocking about the usual horizontal transverse axis of the fifth-wheel connection and to cause it to lift the tractor as it itself is lifted. Preferably, this is done by effecting a close tie between the tractor chassis and the goosenck rearwardly of the rocking axis so that the two must lift together as a unit in fixed relation to each other. With this connection, assuming the trailer body is detached from the gooseneck or at its forward end can rock and lift vertically with the hitch, it is only necessary to manipulate the lifting hoist of the gooseneck for hoisting up the rear of the tractor and suspending it above the ground by the gooseneck and its hoist.

As to the trailer, it is only necessary to hoist the front end of the trailer body above the ground, preferably above the normal level at which it operates, while the gooseneck is free to rock about the normal horizontal transverse axis of the fifth-wheel member on the tractor and relative to the front end of the trailer. With the gooseneck and forward end of the trailer body thus elevated, suitable fulcrum means are disposed beneath the body at a location preferably near the rear wheels or at such a location that the body and its load will be overbalanced forwardly of the rear wheels, when lowered onto the fulcrum means. Thus, when the forward end of the trailer body is lowered by the gooseneck hitch below its normal operating position or sufficiently low to rock across the fulcrum, the rear wheels of the trailer are lifted clear of the ground.

Various more specific objects and advantages will become apparent from the following description wherein reference is made to the drawings, in which:

Figs. 1 through 4 are fragmentary side elevations of a tractor and trailer combination embodying the principles of the present invention and showing different operating positions of the tractor and trailer, Fig. 1 showing the tractor and trailer coupled for travel, Fig. 2 showing the tractor and trailer with the detachable gooseneck in position for final coupling or uncoupling, and Figs. 3 and 4 showing the tractor and trailer with the detachable gooseneck coupled but with the gooseneck tilted rearwardly and forwardly, respectively;

Fig. 5 is an enlarged fragmentary, vertical, longitudinal sectional view of a portion of a trailer and detachable gooseneck in position for coupling or removal of gooseneck, and is taken on the line 5—5 in Fig. 8;

Fig. 6 is a view similar to Fig. 5 but showing the rear of the gooseneck elevated and the front end of the trailer supported thereon with the locking means moved into place for locking the trailer body and gooseneck against downward rocking movement beyond traveling position;

Fig. 9 is a fragmentary side elevation, similar to Figs. 1 through 4, showing the gooseneck detached from the trailer and the tractor supported in elevated position with its rear wheels clear of the ground;

Figure 7:
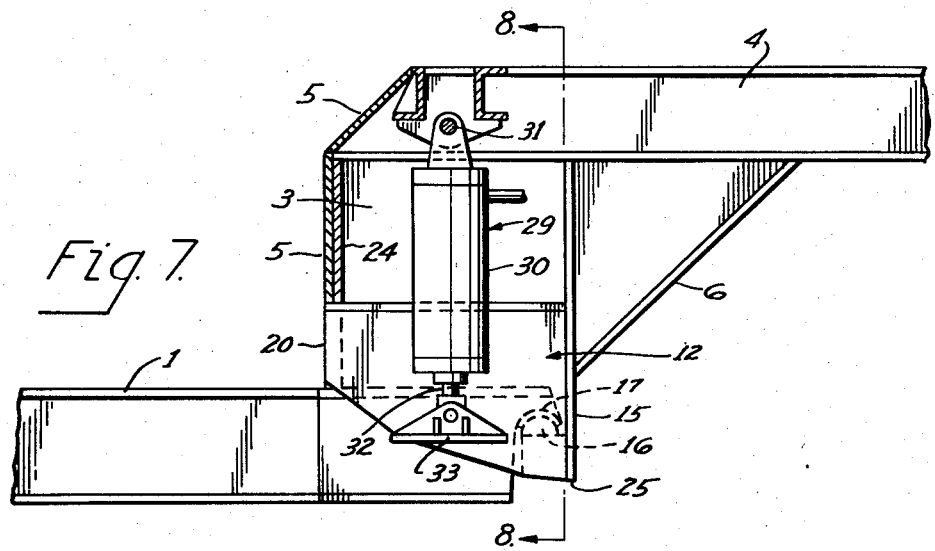
Fig. 7 is a view similar to Figs. 5 and 6 but showing the trailer and gooseneck in normal coupled position, part of the structure being shown in section for clearness in illustration.
Figure 8:
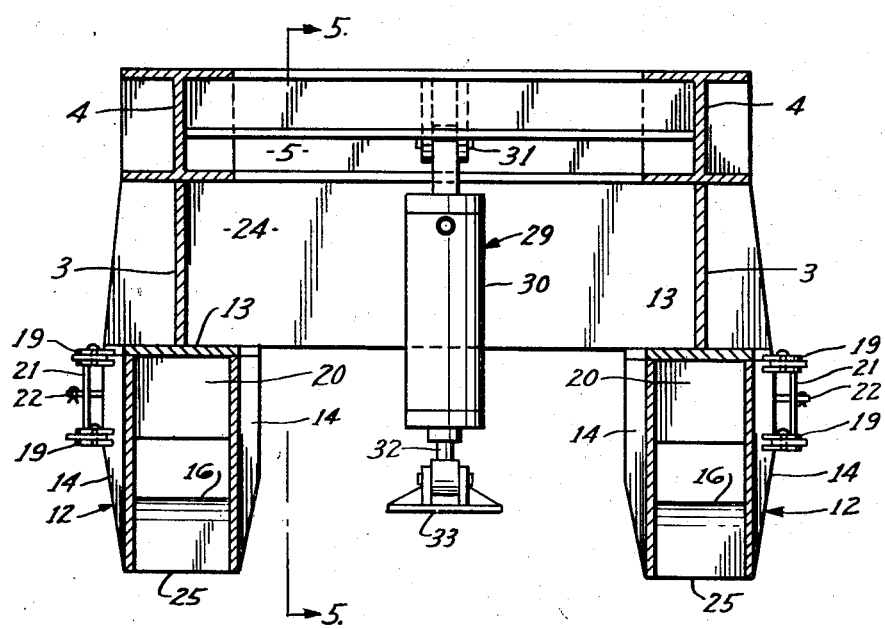
Fig. 8 is a fragmentary, sectional view of the detachable gooseneck, and is taken on the line 8—8 in Fig. 7.

Fig. 10 is a fragmentary side elevation showing the tractor and trailer combined with the gooseneck supporting the body in a raised position for inserting a fulcrum means beneath the trailer body, and Fig. 11 is a view, similar to Fig. 10, but showing the gooseneck detached from the trailer and moved forwardly with the body overbalanced forwardly and supporting its own wheels above the level of the ground.

Referring to the drawings, and as more fully described in the above entitled Patent No. 2,590,210, the trailer comprises a pair of longitudinal weight-supporting girders or sills 1 which are spaced apart from each other and are connected with suitable cross bracing, not illustrated, so as to provide a rigid body or platform structure. The rear end of the trailer is supported by suitable rear wheel assemblies 2 which may be of the detachable rim type or the type in which the wheels or assemblies themselves may be removed, all in a well known manner.

The gooseneck of the present invention comprises the usual rigid upright side frame members 3 spaced laterally of the trailer from each other and an upper forwardly extending horizontal member 4 secured to the upper ends of the members 3. All of these members may be constructed in whole or part of I-beams or suitable steel structural elements so as to provide a rigid structure. Bridging between and connecting the upright members 3 and horizontal member 4 are suitable tie plates 5. These tie plates preferably are welded to the member 4 and to the rear edges of the upright members 3, thus providing a transversely rigid structure. Reinforcing gussets 6 may be provided between the forward portion of the upright members 3 and the horizontal member 4.

As illustrated, the forward ends of the horizontal member 4 are beveled upwardly forwardly at their under surfaces, as indicated at 7, and a skid plate 8 is secured thereto and bridge across the space between the members. The skid plate 8 preferably extends toward the upright members 3 beyond the bevel 7 a sufficient distance to rest on and form the main bearing surface or plate of the gooseneck for cooperation with the usual upwardly exposed fifth-wheel member 9 on the tractor. The usual kingpin is carried on the gooseneck within the limits of the plate 8. In the form illustrated, a conventional upwardly facing fifth-wheel member is shown as connected to the rear of a tractor 10 for rocking about a horizontal shaft which extends transversely of the tractor. Suitable means are provided on the fifth-wheel member for latching the kingpin in place in the central socket of the member 9. This fifth-wheel structure is conventional and well known in the art.

Referring to the details of the detachable gooseneck structure, secured to the lower edges of the upright members 3, respectively, are sockets, indicated generally at 12. Since they are the same in form and function only one will be described.

Each socket 12 is in the form of a box which is open at the rear of the gooseneck and is partially open at the bottom. The socket 12 may be formed of a top plate 13 and side plates 14 and a front plate 15, all of which are secured together by welding. The plates 14 are divergent rearwardly of the gooseneck so as to form a guide for the forwardly extending ends of the sills 1.

Fixedly secured to the lower portion of the plate 15 at the rear face thereof is an upwardly facing coupling member 16, the upwardly facing surface of which is preferably hemi-cylindrical. The coupling member 16 is coextensive in width with the socket 12 and the hemi-cylindrical portion thereof is spaced rearwardly a short distance from the plate 15.

The coupling members 16 are adapted to engage with complementary coupling members 17 mounted on the forward ends of the sills 1, respectively. The forward end of each longitudinal sill is tapered laterally inwardly and toward the forward end so as to be substantially complementary to the inner side faces of the plates 14. Suitable skid plates are provided under the forward ends of the sills to reinforce them and to guide them accurately into the open rear ends of the sockets 12. Pivotally secured on the plates 14 for swinging movement about upright axes are suitable pairs of brackets 19 which extend rearwardly of the sockets. Connected to the rear ends of the pairs of brackets are locking members or plates 20, respectively, these locking members extending at substantially right angles to the brackets so as to be positioned across the open ends of the sockets when in locking position, but being adapted to be swung outwardly and forwardly of the trailer to a fully retracted or inoperative position. In order to latch the locking plate members in locking position, a suitable plate 21 is secured between each pair of brackets 19 and is provided with an aperture through which is received a tongue 22 carried on the plate 14. The tongue is arranged to extend through the plate 21 and therebeyond when the locking members are in locking position. Each tongue 22 has a suitable aperture through which a cotter pin is passed to latch the locking members in locking position. The plate 5, heretofore described, extends downwardly between the upright members at the rear thereof and terminates at its lower edge at the level of the upper edge of the members 20 so as to permit the plates to be swung into position beneath the lower edge of the plate 5 with operating clearance when the gooseneck and trailer are moved almost into normal coupled relation.

It is apparent that when the coupling member 16 of the gooseneck and 17 of the trailer are in normal coupling relation and the members 20 are inserted between the lower edge of the plate 5 and the top of the sills 1, the gooseneck is secured against rocking rearwardly. On the other hand, if the members 20 are removed or swung out of locking position, the gooseneck can be rocked rearwardly about the coupling member 16 relative to the transverse axis of the fifth wheel on the tractor. Even when the locking members 20 are in locking position, the gooseneck can be rocked forwardly but the weight on the trailer and gooseneck is so great that such forward rocking movement normally does not occur. Instead, one of the points of greatest stress is the compressive force on the locking members 20 exerted upwardly by the sills and downwardly by the plate 5.

In order to develop the full bearing capacity on the upper edges of the locking plates 20, an extra plate 24 may be secured to the inner face of the plate 5 and extend above the sockets for engagement with the upper edges of the plates 20.

It is apparent that, in the structure described, the gooseneck can be detached from the trailer by swinging the plates 20 into idle position from between the sills and plates 5 and 24 and lowering the front end of the trailer by permitting the gooseneck to tilt rearwardly, about the horizontal transverse axis of the fifth-wheel member, until the front end of the trailer rests upon the ground, and by then tilting the gooseneck still further rearwardly to lower the coupling members 16 below the coupling members 17.

As best illustrated in Fig. 7, the lower edge of the gooseneck, indicated at 25, is positioned so that when the front end of the trailer body rests on the ground and the coupling members 16 are lowered to clear the lowermost portion of the coupling members 17, the edge 25 clears the ground, and the gooseneck can be removed forwardly free of the trailer.

In order to prevent the gooseneck from striking the ground and to maintain it at its right elevation so that, while the front end of the trailer is resting on the ground, the gooseneck can be moved rearwardly and the coupling members 16 caused to pass beneath the coupling members 17, suitable pads 27 and 28 are provided on the under side of the forwardly extending members 4 and the upper faces of the sills of the tractor 10, respectively. As illustrated, these pads are so arranged when the gooseneck has rocked downwardly about the shaft 11 of the fifth wheel until the pads are engaged with each other, the lower edge of the gooseneck clears the ground and the highest point of the coupling members 16 clears the lowest point of the trailer.

In order to manipulate the gooseneck for attachment and detachment, selectively, and into normal position and forwardly and rearwardly tilted positions with respect to the forward end of the trailer, an elevating and lowering hoist, preferably in the form of a single suitable extensible and contractible piston and cylinder assemblage 29 is provided.

The assemblage 29 preferably comprises a hydraulic cylinder 30 which is secured at its upper end by a pivot 31 to the gooseneck member so that the cylinder can swing forwardly and rearwardly to compensate for its angular position due to the tilting of the gooseneck upon extension of the assemblage. The cylinder 30 is provided with a piston having a rod 32 upon which is pivoted a suitable landing foot 33 which is adapted for engagement with the ground. The piston and cylinder assemblage is so arranged that upon extension of the assemblage with the foot 33 in engagement with the ground, the rear end of the gooseneck can be lifted a considerable distance. Since the gooseneck is pivoted to the tractor for rocking about the transverse axis 11 of the fifth wheel, the extension of the assemblage ordinarily merely lifts the rear end of the gooseneck and thus makes it possible to hoist the front end of the trailer to a position above its normal operating position. These operations will be best understood by reference to Figs. 1 through 4.

In Fig. 1, the tractor and trailer are shown in normal traveling condition with the gooseneck in generally horizontal position and the plate 20 interposed between the gooseneck and the sills of the trailer so as to lock the trailer and gooseneck in connected condition.

Referring next to Fig. 2, when it is desired to detach the gooseneck from the trailer, the assemblage 29 is first operated to apply the shoe 33 to the ground and then lift the rear end of the gooseneck a slight amount so that the plates 20 can readily be removed to idle position. After the plates 20 are removed, then the assemblage 29 is operated to lower the gooseneck until the connecting members 16 and 17 are disengaged, at which time the pads 27 and 28 are in engagement and the tractor can be moved forwardly carrying with it the gooseneck.

This is the position also in which the gooseneck can be backed into position for connecting to the trailer body. After it is backed into such position, the assemblage 29 is again manipulated to lift the rear end of the gooseneck a sufficient distance so that the plates 20 can be interposed between the sills and the plate 5 of the gooseneck, after which the assemblage 29 is manipulated to lower the gooseneck slightly so that the plates are bound firmly into position.

In Fig. 3, the operation is shown in which the gooseneck is connected to the forward ends of the sills and is slightly raised or slightly lowered, depending upon the starting position.

In Fig. 4, there is illustrated the manipulation of the gooseneck by the assemblage 29 so as to lift the rear end of the gooseneck a considerable distance above the normal position in which it operates, and so as to lift with it the forward end of the trailer body 1. This is for purposes of clearing very high crests in the roadway due to changes in grade in roads over steep railroad crossings. The piston and cylinder assemblage is adequate for this purpose, and a suitable block 34 may be interposed between the plate 20 and the top of the sills to retain the trailer body and gooseneck in this extra high position for the time required.

With this structure understood, then the question arises as to how to use the gooseneck so as to raise the rear end of the tractor. As illustrated, the tractor is shown having rear wheels 35a and front wheels 35. In order to hoist the rear end of the tractor, the gooseneck is lowered to its lowermost position in which the pads 27 and 28 are in engagement. In this position, auxiliary means such as a tie or connector 36 which, in the form illustrated, may be a suitable chain, is so applied as to connect the chassis or rear wheel assemblage of the tractor to the forwardly extending portion 4 of the gooseneck rearwardly from the pivotal axis 11. This is preferably done by placing the chain, when the pads are in engagement, so that the gooseneck and chassis move substantially as a unit. However, a certain amount of slack may be left in the connection so as to cradle the rear end of the tractor from the gooseneck when the gooseneck is raised without binding them firmly together. In any event, when the forward portion of the gooseneck 4 is connected to the chassis of the tractor, usually after the gooseneck has been detached from the trailer body, the assemblage 29 is manipulated to cause the shoe 33 to engage the ground and then is further extended to hoist the gooseneck and, with it, the rear of the tractor body, the tractor pivoting about the forward wheels during this operation. The length to which the assemblage 29 can be extended is adequate to lift the rear wheels 35a, both forward and rearward sets in case such are provided, clear of the ground.

After the tire or wheel is changed, it is only necessary again to lower the gooseneck, disconnect the tie or connector 36, in which case the gooseneck is ready for operation in its conventional manner.

When it is desired to use the gooseneck for hoisting the rear of the trailer, the gooseneck is hoisted to the position illustrated in Figs. 4 and 10. Thereupon, the plates 20 are removed. An auxiliary means such as a fulcrum 38 is then disposed beneath the trailer body, preferably near the rear wheels, or sufficiently near the rear wheels so that the trailer body, as lowered, will overbalance forwardly when it is lowered across the fulcrum 38. In this position, the hoist assemblage 29 is manipulated to lower the gooseneck sufficiently to allow the forward end of the trailer body to approach the ground a sufficient distance to lift the rear wheels of the trailer body clear of the ground. Preferably, this entire operation is performed without totally disconnecting the gooseneck from the trailer body inasmuch as the gooseneck can then operate to prevent shifting of the body forwardly and rearwardly on the fulcrum. Further, the gooseneck can be manipulated so that the body is lowered only a sufficient amount to permit the removal of the wheels, thus reducing the danger of shifting the load, if the trailer body happens to be loaded. After the wheels or ties have been changed, the gooseneck is again hoisted, lifting the body above a level such that the fulcrum can readily be withdrawn. Thereupon, the gooseneck is again lowered with the plates 20 swung into operating position to lock the gooseneck and body together when they reach traveling position.

Thus, it is apparent that the present device, by this simple modification of the gooseneck by a suitable auxiliary means can be used not only for connecting the trailer and tractor together in various adjusted positions and for detachment for loading over the front of the trailer, but also it can be used for manipulating either the tractor or the trailer, or both, for the purpose of hoisting the wheels thereof clear of the ground to facilitate the changing of tires or wheel assemblages, and this can be done without the necessity for removing the load from either the tractor or the trailer.

It is quite often necessary that tires be changed when the tractor or trailer are working in soft ground and are quite deeply embedded. In such instances, it is only necessary to put a suitable footing beneath the foot 33 to hoist the tractor or trailer clear of the ground level and of ruts so that the wheels are readily accessible.

In the form illustrated, the hoist is a single acting hydraulic piston and cylinder assemblage and is provided with a conventional hose 37 which is connected by a valve 39 to a suitable source 40 of pressure fluid, provided on the tractor. Generally, the source of pressure fluid is a gear type pump driven by the engine of the tractor. However, the specific type of hoist and the source for operating the hoist are immaterial, and any convenient extensible and contractible leg or strut and any power source on the tractor, or elsewhere, may be employed.

Having thus described my invention, I claim:

1. In a tractor-trailer combination, a tractor including a rear wheel assembly, a trailer body member including a rear wheel assembly, a gooseneck hitch member, a fifth wheel connecting the hitch member and tractor for swinging about the fifth wheel axis and for rocking movement about a horizontal axis extending transversely of the tractor, coupling means coupling the rear portion of the hitch member and the front of the body member for relative rocking movement about an axis extending transversely of the body member and operable for supporting the forward end of the body member at a plurality of different elevations above the ground by the tractor through the medium of the hitch member, and power operated ground engaging hoist means on at least one of the members for lifting and lowering the rear portion of the hitch member, auxiliary means operable for connecting the tractor and gooseneck member, while the gooseneck member is in a lowered position, for lifting the tractor when the rear portion of the gooseneck member is lifted, and rendered operative by predetermined operation of the hoist means to hoist the rear portion of the gooseneck sufficiently to cause the rear wheel assembly of the tractor to be lifted from the ground.

2. A structure according to claim 1 wherein the hoist means are carried by the gooseneck hitch member.

3. A structure according to claim 1 wherein the hoist means are on the gooseneck hitch member and the auxiliary means is a connector which connects the hitch member to the tractor at a location rearwardly from said horizontal axis of the fifth wheel connection.

4. A structure according to claim 3 wherein the connector is a flexible tie element which connects the rear of the tractor and the hitch member for lifting the tractor when the hitch member is lifted upwardly.

5. In a tractor-trailer combination, a tractor member, including a rear wheel assembly, a trailer body member including a rear wheel assembly, a gooseneck hitch member, a fifth wheel connecting the hitch member and tractor member for swinging about the fifth wheel axis and for rocking movement about a horizontal axis extending transversely of the tractor member, complementary coupling means carried by the hitch member and on the front of the body member, respectively, power operated ground engaging hoist means on one of the members and movable in opposite directions to extend and retracted positions for lifting and lowering the front end of the body member, auxiliary means comprising a removable fulcrum disposable beneath the body member, when the front of the body member is supported above the ground by the hoist means, said fulcrum being of sufficient height and in such a position endwise of the body member that the body member will be supported thereon when the front of the body member is lowered and the body member, when resting thereon, will be overbalanced forwardly, whereby the rear wheel assembly of the body is lifted clear of the ground by the overbalance.

References Cited in the file of this patent

UNITED STATES PATENTS

| | | |
|---|---|---|
| 2,568,231 | Grossman | Sept. 18, 1951 |
| 2,590,210 | Rogers | Mar. 25, 1952 |
| 2,663,574 | Martin | Dec. 22, 1953 |
| 2,708,044 | Sher et al. | May 10, 1955 |

FOREIGN PATENTS

| | | |
|---|---|---|
| 930,725 | Germany | July 21, 1955 |